March 17, 1936.　　　M. H. ROBERTS　　　2,034,271
LOCOMOTIVE
Filed Jan. 18, 1933　　　8 Sheets-Sheet 5

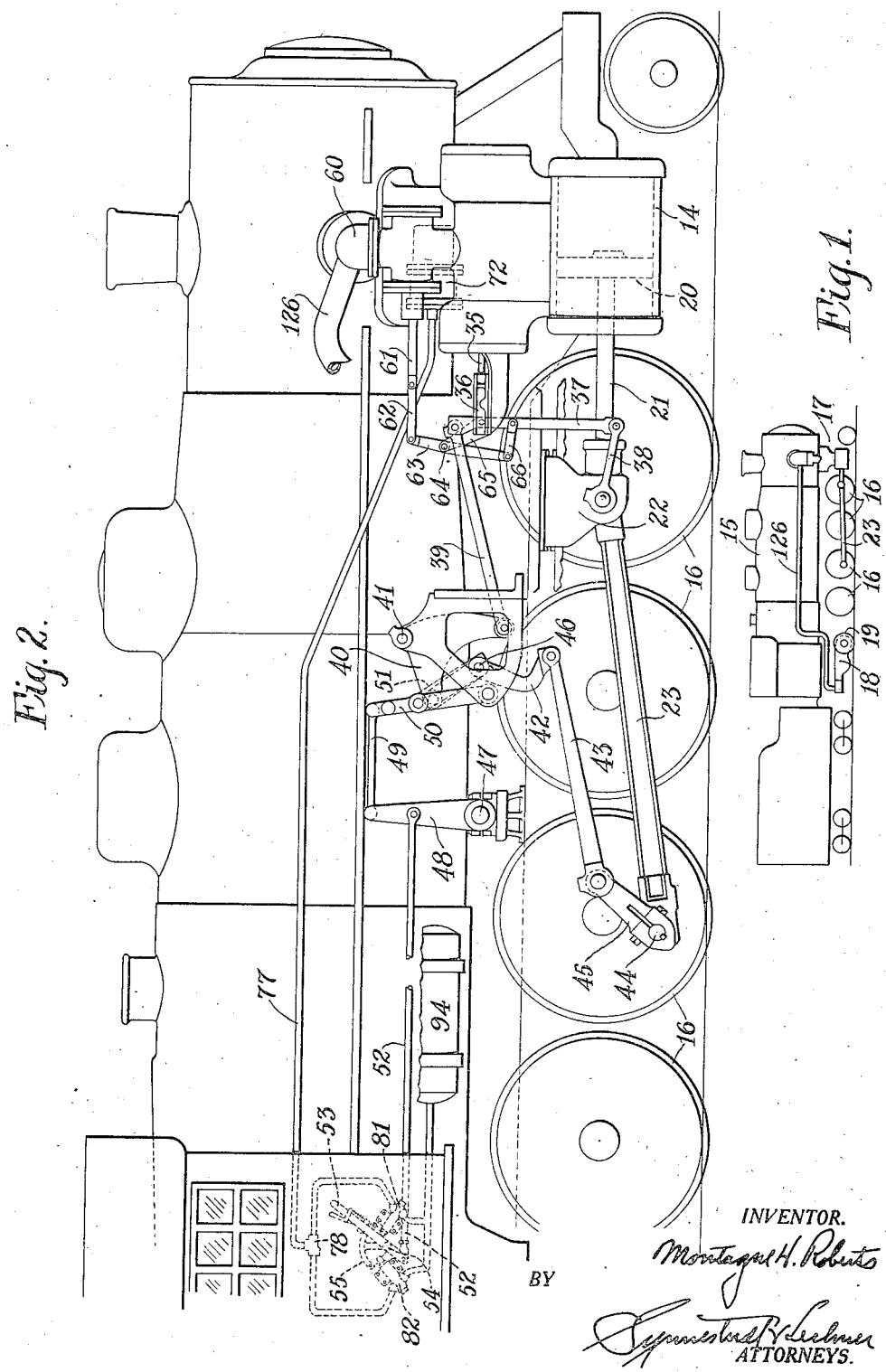

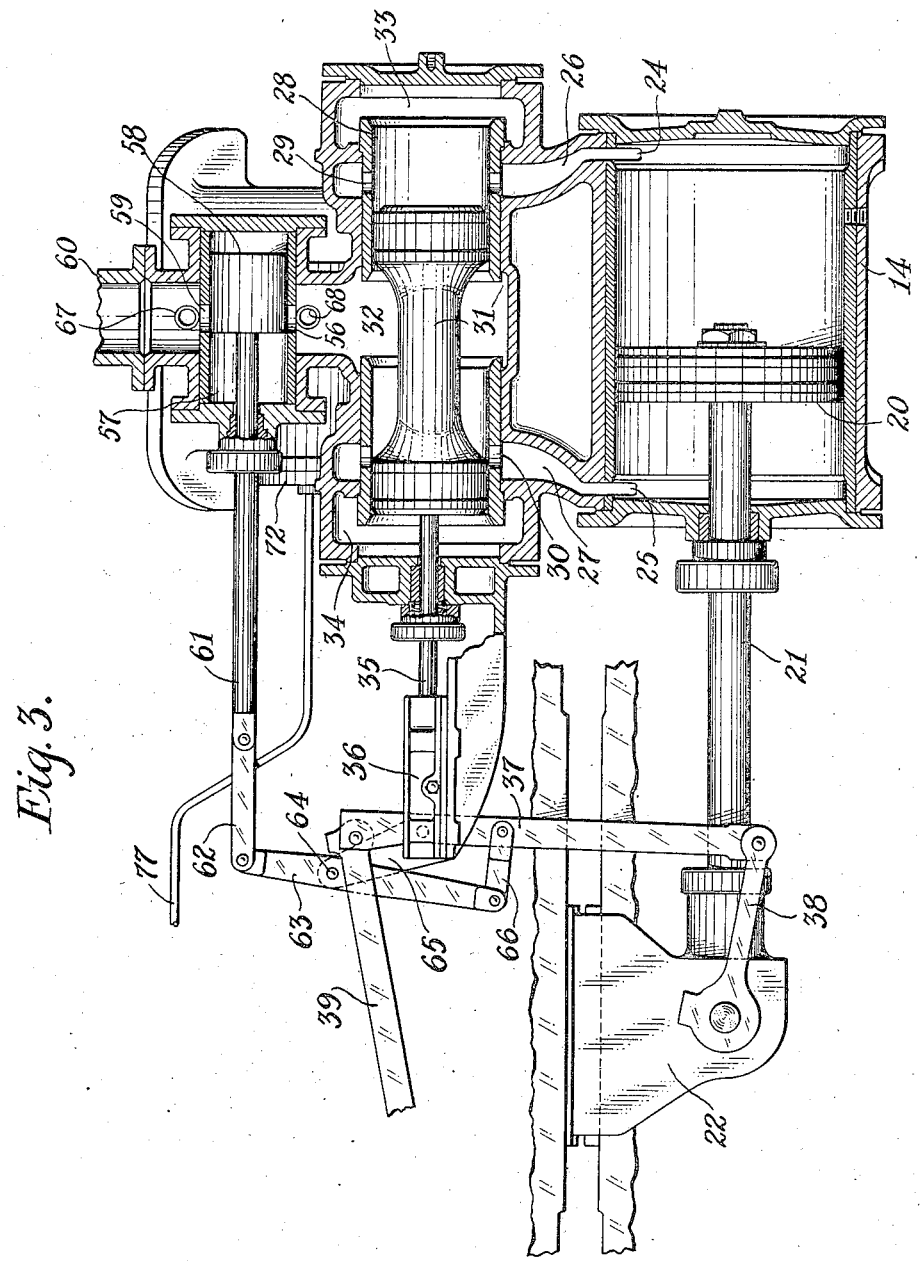

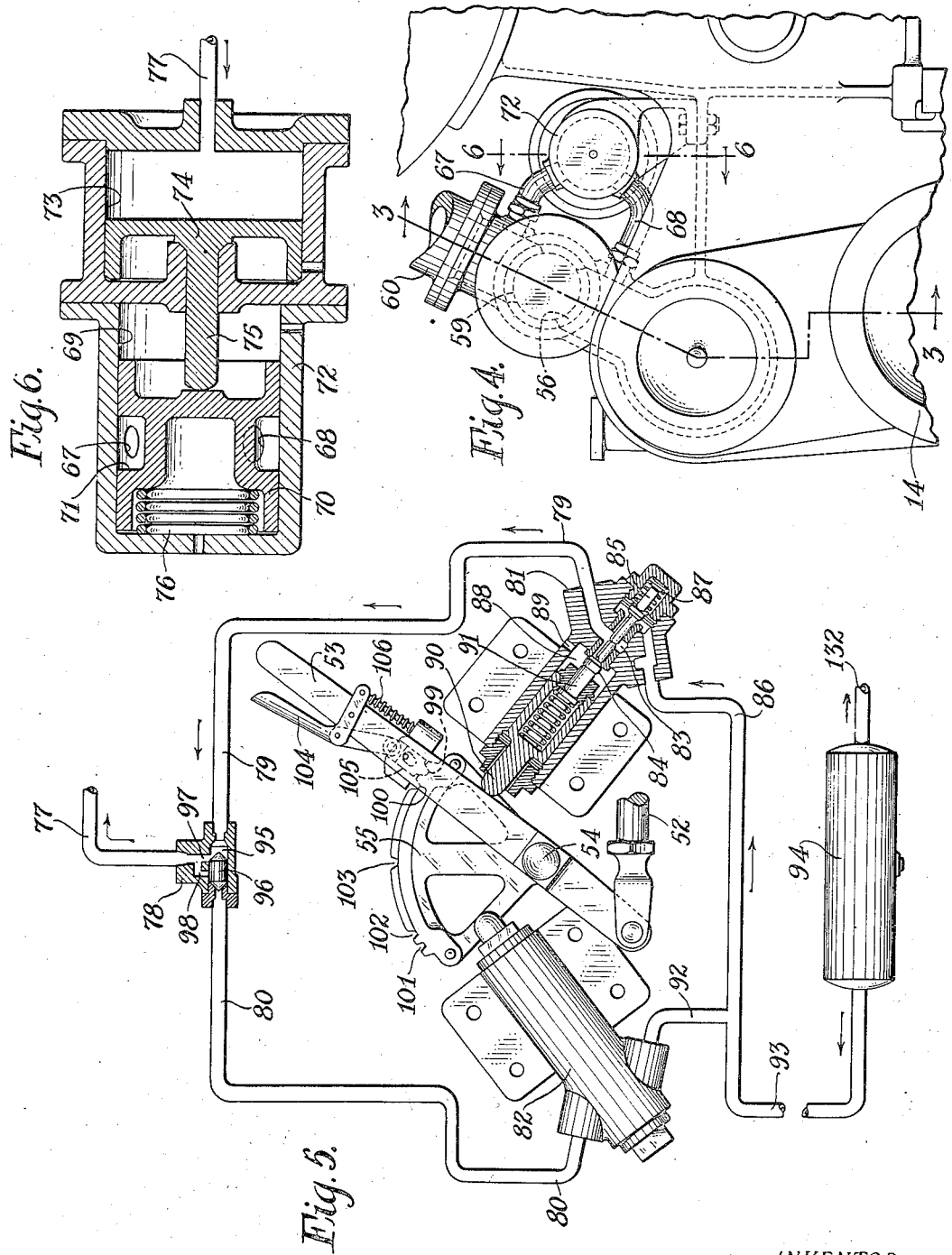

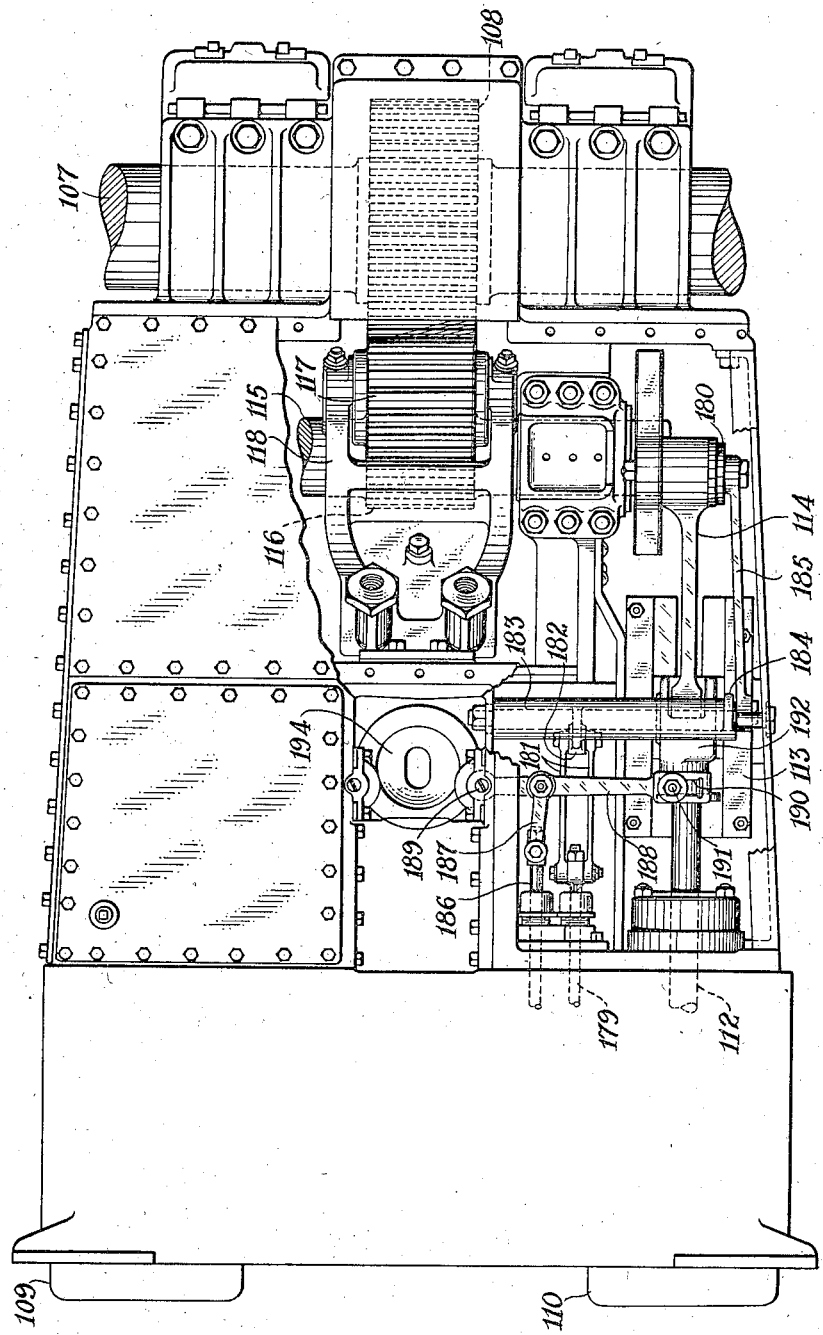

INVENTOR
Montague H. Roberts
BY
Lynnested & Lechner
ATTORNEYS

Patented Mar. 17, 1936

2,034,271

UNITED STATES PATENT OFFICE 2,034,271

LOCOMOTIVE

Montague H. Roberts, Englewood, N. J., assignor to Franklin Railway Supply Company, New York, N. Y., a corporation of Delaware Application January 18, 1933, Serial No. 652,353

5 Claims. (Cl. 105—48)

This invention relates to locomotives and is especially concerned with an engine or engines therefor.

More particularly, the invention is concerned with the distribution and control of steam delivered to engines or propulsion units of locomotives. For a thorough and complete understanding of the invention, reference is first made to certain structural and operating characteristics of the types of locomotives commonly employed at present.

The present widely used types of locomotives include, as a primary propulsion unit, an engine including a plurality of pistons and cylinders, usually two or three, the cylinders being equipped with steam distribution or valve means set to provide what has been termed a "limited cut-off". As is well known, this term applies to a steam distribution mechanism which provides for the admission of motive fluid to the cylinders only during a fraction of each stroke of the cylinder pistons. The "valve gear" or actuating mechanism for the steam distributing valves is also commonly arranged to permit variation in the cut-off up to about 70% or 80%, for example. That is, the valve gear is capable of adjustment to provide for the admission of steam to each cylinder throughout percentages of each piston stroke varying up to about 70% or 80%. The latter limit or "late" cut-off is, of course, employed primarily in starting and the cut-off is usually progressively shortened as the high running speeds are approached.

There are a number of well known and commonly employed types of valve gears or motions which provide for the adjustment above referred to as well as for complete reversal of engine operation, and among these might be mentioned the Walschaert and the Baker types.

As commonly employed, however, these more or less well known controlling and actuating mechanisms for the distribution valves are subject to a number of disadvantages, some of which are brought out just below.

In the first place, since it has been necessary heretofore to provide for the relatively wide range of adjustment referred to, the movements of the distributing valves themselves to not produce the best operating conditions and efficiencies throughout the entire range of adjustment. One specific instance of the type referred to arises by virtue of the fact that when the usual reverse lever is adjusted or "hooked-back" to advance the point of steam cut-off and thus permit the cylinders to use the steam expansively throughout a larger portion of each piston stroke, the actual valve movements become so small or slow in uncovering and closing the steam ports that "wire drawing" of the steam results. That is, during at least a large part of the time during which the port is open, the actual cross-sectional area of the opening is relatively small.

Considered in another way, the characteristics of the types of distributing valves and valve motions referred to are such that it is not possible to obtain full and quick port opening when the engine is working on an early or short cut-off and at the same time, provide the necessary range of cut-off adjustment so that full power (with large port openings and long or late cut-off) is available in starting and at low speeds. For efficient operation, especially at high running speeds, of course, it is highly important that the valve mechanism should have quick action and give a full port opening during the relatively short period of steam admission so that there will be a maximum interval of time during each piston stroke in which the steam may act expansively, as well as maximum pressure in the cylinder at the moment of port closure. This becomes of increasing importance in proportion to increases of the steam pressure on which the engine is operating, since the advantages of higher steam pressure are at least in large measure due to the possibility of employing the steam expansively throughout a greater portion or percentage of each piston stroke.

In addition to the foregoing, the present widely adopted types of valve gears or motions, bearing in mind that they must be capable of adjustment over a wide range of cut-offs, produce undesirable or inefficient conditions with respect to the points of release and compression. That is, it is impossible with the present types of valves and actuating mechanisms to provide the full port opening when an early or short cut-off is employed and at the same time maintain the desired position or relation of the points of release and compression in each cycle of operation. These difficulties, of course, are complicated considerably by virtue of the fact that a wide variation in cut-off must be provided in order to obtain the desired operation at high speeds and at the same time full power in starting.

Still another disadvantage inherent in the present widely adopted types of valve motions and controls is the fact that the usual reverse lever and the associated valve motion parts are so arranged as to permit graduated adjustment of the cut-off between the long and short limits of any particular equipment. The operator or engineer, of course, is intended to make the adjustments referred to in order to provide the most economical operation with regard to steam consumption, but, through inadvertence, carelessness or lack of knowledge, the efficient and proper adjustment very frequently is not made.

The present invention has reference to eliminating or at least partially correcting difficulties of the foregoing nature and, therefore, generally stated, the present invention is concerned with the provision of steam distribution and control mechanism for engines or propulsion units of locomotives capable of improving operating conditions and increasing efficiency, especially with regard to steam consumption.

More specifically, this invention has in view the provision of a steam engine having distribution and control mechanism associated therewith and arranged to provide for operation preferably at only two substantially predetermined cut-offs. With this in mind, the invention includes steam distributing valves for the cylinders of an engine so arranged and controlled that the engineer may set the valves for operation either at a late cut-off (for use in starting and up to moderate speeds) or at a relatively early cut-off (for moderate and high speed operation).

Furthermore, in the preferred embodiment of the invention, I employ a control lever, generally of the "reverse lever" type, which provides for reversal of engine operation but which has only two positions of cut-off adjustment for each direction of engine operation.

Another important feature of the present invention is involved in the combination, with a main engine of the type just referred to, of an auxiliary engine or propulsion unit constructed and arranged to supplement the tractive effort in starting and also at moderate speeds preferably up to a speed materially higher than has been customary heretofore in the use of auxiliary engines. This is of very great importance since it provides reduced total steam consumption by the locomotive (including main and auxiliary engines) and, at the same time, increased net power or drawbar pull over a wide range of running conditions. Still further, this arrangement of main and auxiliary engines provides for operation of the locomotive with high efficiency at high speeds by virtue of the steam or distribution valve mechanism employed, the reasons being pointed out more fully hereinafter.

In addition to all the foregoing, the present invention contemplates the use of an auxiliary propulsion unit (preferably in combination with a main engine of the type referred to) which is similarly equipped with steam distribution mechanism designed to provide operation at either one of two substantially predetermined cut-offs.

With regard to the combined use of a main engine of the character above referred to and an auxiliary propulsion unit, especially when the latter is similarly equipped with dual or duplex cut-off, it should be observed that, even though no finely graduated cut-off adjustments are possible in either the main engine or the booster, at the same time, a very wide range of operating conditions may be met efficiently. For example, the main engine may be employed alone and operated at its long or late cut-off; or the main and auxiliary engines may both be employed and operated at their long or late cut-offs; or the main engine may be operated at its late cut-off and the auxiliary engine at its early cut-off; etc.

With regard to the auxiliary propulsion unit, commonly called a "booster motor", the following more or less specific objects and advantages should be noted.

Boosters of this type are commonly applied to any normally idle weight-carrying axle of the locomotive, such as the trailing axle of the engine or a truck axle of the tender, the primary purpose of the booster being to facilitate the main driving means of the locomotive in starting heavy trains and hauling heavy loads at relatively low speeds and up steep grades. In view of the clearance limitations and somewhat cramped space within which the booster must be applied, the distributing valves for the booster cylinders have heretofore been substantially predeterminedly set as to their cut-off in order to avoid complications and increase in size which would result from the use of a mechanism for adjusting the cut-off.

Another point which should be considered in connection with the steam distribution means of a booster motor is the fact that a cut-off control of the more usual reverse lever type providing for relatively finely graduated alterations in cut-off (for example, the type ordinarily employed for the main cylinders of a locomotive) is not suitable for application to a locomotive booster motor, primarily for the reason that the booster motor, in being mounted on a locomotive trailer or tender truck, must be capable of a wide variety of movements relative to the frames of the engine or tender. Since a graduated cut-off control mechanism necessarily requires an operating connection extended to the cab of the engine, the relative movements of the booster motor would present very serious difficulties in making the operating connection.

For reasons such as those brought out above, the cut-off of booster engines has heretofore been fixed or set, the setting representing a mean or average between that which would be most efficient in starting and that which would be most efficient after a fair degree of forward speed has been attained.

Since, as a practical matter, it would be very difficult, if not impossible, to apply adjustable means for graduating the cut-off of the booster engine (for reasons above referred to), as above noted I contemplate the use of valve means constructed to provide for operation at two different cut-offs, one of relatively great length for starting purposes and the other considerably limited or restricted for use after some forward speed has been attained.

Furthermore, the valve and other means which I have provided to accomplish the foregoing are such as may readily be applied to the booster engine in spite of the cramped space and clearance limitations within which the application must be made.

In addition to the foregoing, this invention has in view provision of means for automatically ensuring operation of the booster engine at the desired cut-off when starting and at the desired cut-off after some forward speed has been acquired.

Brief description of the figures

How the foregoing together with other objects and advantages are obtained will be more apparent from a consideration of the following description making reference to the accompanying drawings, in which—

Figure 1 is a somewhat diagrammatic side view showing the general arrangement of a locomotive equipped with the main and auxiliary propulsion units of the present invention;

Figure 2 is a side view of a portion of an engine, on a considerably enlarged scale, in order to illustrate the main cylinders, and the associated valve controlling and actuating mechanism;

Figure 3 is a vertical sectional view through a main engine cylinder with its associated valves and valve controlling mechanism, this view being taken substantially on the line 3—3 of Figure 4;

Figure 4 is a front elevational view of the cylinder and valve arrangements at one side of the engine;

Figure 5 is a somewhat diagrammatic layout of the manually operable control system for the distribution valves of the main engine;

Figure 6 is a vertical sectional view taken substantially as indicated by the section line 6—6 on Figure 4, and illustrating a controlling device to be described more fully hereinafter;

Figure 7 is a top plan view of a booster motor with portions broken away so as to disclose others lying therebeneath;

*Description of the main engine structure*

Figure 8:
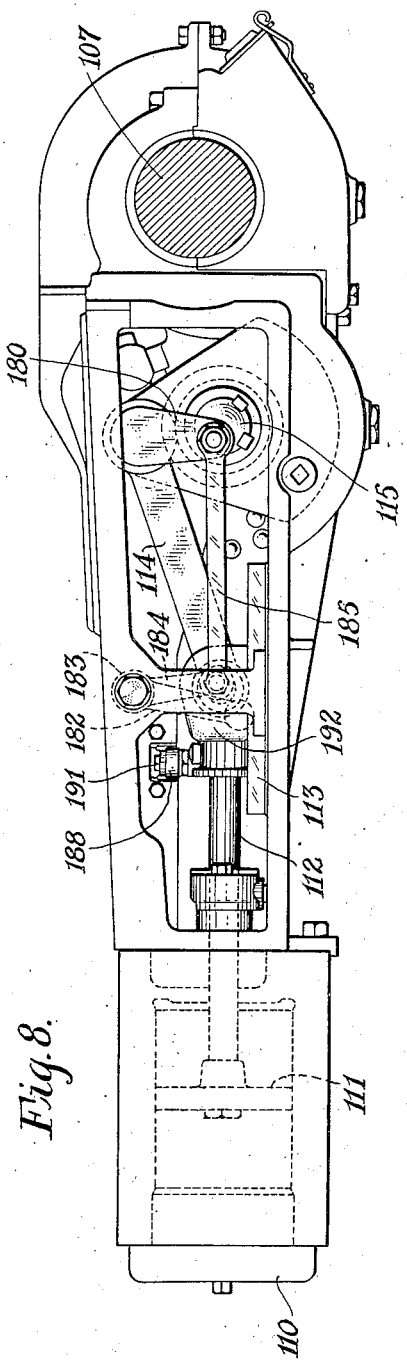
Figure 8 is a side elevational view of the motor shown in Figure 7, with a side casing cover removed.

In considering the drawings, reference is first made to Figure 1 which shows certain main engine parts generally designated by the numeral 17 disposed toward the forward end of the boiler 15 and adapted to drive the main driving wheels 16 through connecting and side rods 23. While the booster motor generally identified at 18 is illustrated as being applied to the trailing wheels 19 of the engine, it should be understood that this unit may also, if desired, be associated with a truck axle under the tender of the locomotive.

A main engine cylinder is also identified in Figures 2, 3 and 4 by the numeral 14, and in these three latter views a piston 20 is shown as reciprocable in cylinder 14 and also coupled by the piston rod 21 to the cross-head 22 which, in turn, is connected by rod 23 to the driving wheels 16.

The head-end and crank-end ports to cylinder 14 are shown in Figure 3 at 24 and 25 respectively, and these ports are connected, by means of passages 26 and 27, with the cylindrical valve chamber 28 through additional ports 29 and 30, respectively. The main controlling valve, in this instance of the double-headed piston type as shown at 31, is reciprocable in the chamber 28 to control, on the one hand, the admission of steam from the central steam chamber 32 to the passages 26 and 27 through ports 29 and 30 and, on the other hand, the exhaust of steam from opposite ends of the cylinder through the same passages but outwardly toward the ends of the steam chest to be discharged from the exhaust cavities 33 and 34.

The actuating mechanism for the main distributing valve 31 is here shown as being generally of the "Baker" type in which the valve stem 35 is connected, through sliding block 36, with the "lap and lead" lever 37 which, at its lower end is, in turn, coupled as by means of link 38 with the cross-head 22. The upper end of the lever 37 is coupled by link 39 with one arm of bell crank 40 pivoted as at 41, and the other arm of this crank is, in turn, connected (through the gear connecting rod 42 pivoted as at 46 to the reverse yoke parts 51) to the eccentric rod 43. Rod 43, of course, is in turn coupled with crank pin 44 (on which the connecting rod 23 is mounted) by an additional crank member 45. The reverse yoke parts 51 are connected as by means of arm 50 and link 49 with the arm 48 of the tumbling shaft 47. The tumbling shaft, and its associated connections and parts, of course, may be employed to effect alteration in the valve movements so as to provide for reverse engine operation in the general manner heretofore followed. Actuation of the arm 48 to effect the reversal referred to is provided for by the reach rod 52 which interconnects the arm 48 with the lower end of the lever 53 preferably through the intermediation of a power reverse gear (not shown). Lever 53 is pivoted as at 54 adjacent the base of quadrant 55. It will be observed, however, that this lever and quadrant arrangement, while generally resembling the "reverse lever" commonly employed, is of somewhat different construction for reasons which will appear more fully as this description proceeds.

It should here be noted that I prefer to set the main distributing valve and its actuating mechanism to effect cut-off at about 65% to 75%, and as a result of this setting, especially where an auxiliary propulsion unit or booster motor is employed in combination with the main engine, it becomes unnecessary to employ starting ports and passages for reasons which will appear more fully hereinafter.

Returning now to the valve mechanism associated with cylinder 14, it will be seen that the central admission chamber 32 of the main distributing valve 31 communicates, through port 56, with a cylindrical valve cavity 57 in which valve 58 is arranged for movement to open or close the port 56 as well as an additional port 59 which communicates with the main steam or dry pipe 60. It will at once be seen, therefore, that steam may be supplied to the central cavity 32 of the main distribution valve only when valve 58 is moved in one direction or the other to open the generally oppositely disposed ports 56 and 59.

In accordance with this invention, the valve 58 is provided with an actuating mechanism which will permit flow of steam from the dry pipe 60 to the chamber 32 only during a relatively short portion of each piston stroke. That is, this valve has a relatively early cut-off, for example, at from 25% to 35% of each piston stroke. The mechanism employed for this purpose includes an actuating stem 61 connected by link 62 with the upper end of a lever 63 which is pivoted as at 64 intermediate its ends to a fixed bracket member 65. The lower end of lever 63 is in turn coupled by pivoted link 66 with the lap and lead lever 37 at a point below the point of connection of the latter with block 36 of the actuating mechanism for the main distributing valve 31. Valve 58 thus is given a reciprocatory movement partaking not only of the lap and lead motion of lever 37 but also of the eccentric motion of rod 43 and, with these various actuating parts for the cut-off valve 58 arranged in the manner set forth above, the steam admission to chamber 32 will be cut off at the desired early point during each piston stroke.

With a view to providing a cut-off materially extended over that permitted by normal operation of valve 58, I prefer to employ a by-pass around valve 58. As seen in Figures 3 and 4, this by-pass is provided by means of a pair of passages or conduits 67—68 which communicate, respectively, with the dry pipe 60 and with the chamber 32. The other ends of these passages open into the interior of a cylindrical valve chamber 69 in which valve 70 having an annular cavity 71 is arranged for movement either to close passages 67—68 or to interconnect them through the cavity 71, the latter position being that shown in Figure 6.

This control valve device which is indicated generally by the numeral 72 in Figures 4 and 6 also includes a cylinder 73 adapted to accommodate the piston 74. This piston, in turn, has a stem 75 adapted to abut against a portion of valve member 70 in order to effect movement thereof in one direction (to the left as viewed in Figure 6). Movement in the opposite direction may be provided for by spring 76.

For the purpose of controlling movements of the valve in the device 72, I preferably employ an air or other fluid pressure line 77 connected, through double check valve device 78 (see Figure 5), alternatively to the branch pipes 79 and 80. The pipes 79 and 80 extend to complementary forward and reverse pilot valves 81 and 82, respectively. These valves may conveniently be of identical construction, and from the sectional showing of valve 81 in Figure 5, it will be seen that pipe 79 communicates with a valve chamber 83 at opposite sides of which valves 84 and 85 are provided. The latter valve is positioned to control the admission of air through connection 86 and is normally urged toward closed position by spring 87. Air may be exhausted from connection 79 and chamber 83, when valve 84 is open, through chamber 88 and port 89. The actuating mechanism for valves 84 and 85 includes a plunger 90 disposed to be engaged by the lever 53 when moved forwardly to its extreme position. Plunger 90 carries a spring-pressed actuating element 91 which abuts against the upper face of valve 84.

The valve and actuating mechanisms included in the pilot device 82, as already mentioned, may be entirely similar to those just described, and the air inlet connection for device 82 is indicated in Figure 5 at 92. The connections 86 and 92 may conveniently join to be extended through an additional pipe 93 to the air reservoir 94.

The double check valve device 78 includes a central chamber 95 with which pipes 79 and 80 communicate. This chamber receives the reciprocable check or valve member 96 which prevents exhaust of air, for example through pipe 80 and valve device 82 when pressure is delivered to chamber 95 through connection 79. This particular position of the valve member is illustrated in Figure 5, from which it will also be seen that a passage 97 is at this time open to provide communication with the conduit 77 extended forwardly to the control device 72. The check device 78 also includes a similar passage and port 98 which serves to couple pipe 80 and connection 77 when pressure is admitted to the chamber 95 from pilot valve 82 through pipe 80.

Referring to the quadrant 55 for lever 53, it will be seen that only two operative positions or "notches" are arranged at either end thereof. The two forward notches are designated by the numerals 99 and 100 while the two reverse notches appear at 101 and 102. A central or neutral notch 103 may also be provided. Any suitable latch mechanism such as the device indicated at 104, 105 and 106 may be used to maintain the lever in the desired position. In the following description of the operation, it will be brought out that the two forward and reverse notches serve to provide substantially predetermined cut-off conditions either at a relatively early cut-off or at a relatively late cut-off. Before considering the operation in detail, however, reference is now made to the structure of the auxiliary propulsion unit and its associated control mechanisms.

Description of the auxiliary engine structure

Referring now to Figures 7 to 12 inclusive, the normally idle weight-carrying axle to which the booster is applied is designated by the numeral 107. In making an application of the booster, a driven gear 108 is preferably mounted on the axle 107.

In the present embodiment, the motor itself includes a pair of cylinders 109 and 110 each having a piston 111 reciprocable therein. The piston rod 112 for each piston is slidable in crosshead guides 113 and connected by a crank 114 to the crank shaft 115 on which is mounted the driving gear 116. The driving and driven gears 116 and 108, respectively, may be coupled and uncoupled as by means of an idler gear 117 mounted on a rocker device 118, which is pivoted as at 119.

Figure 10:
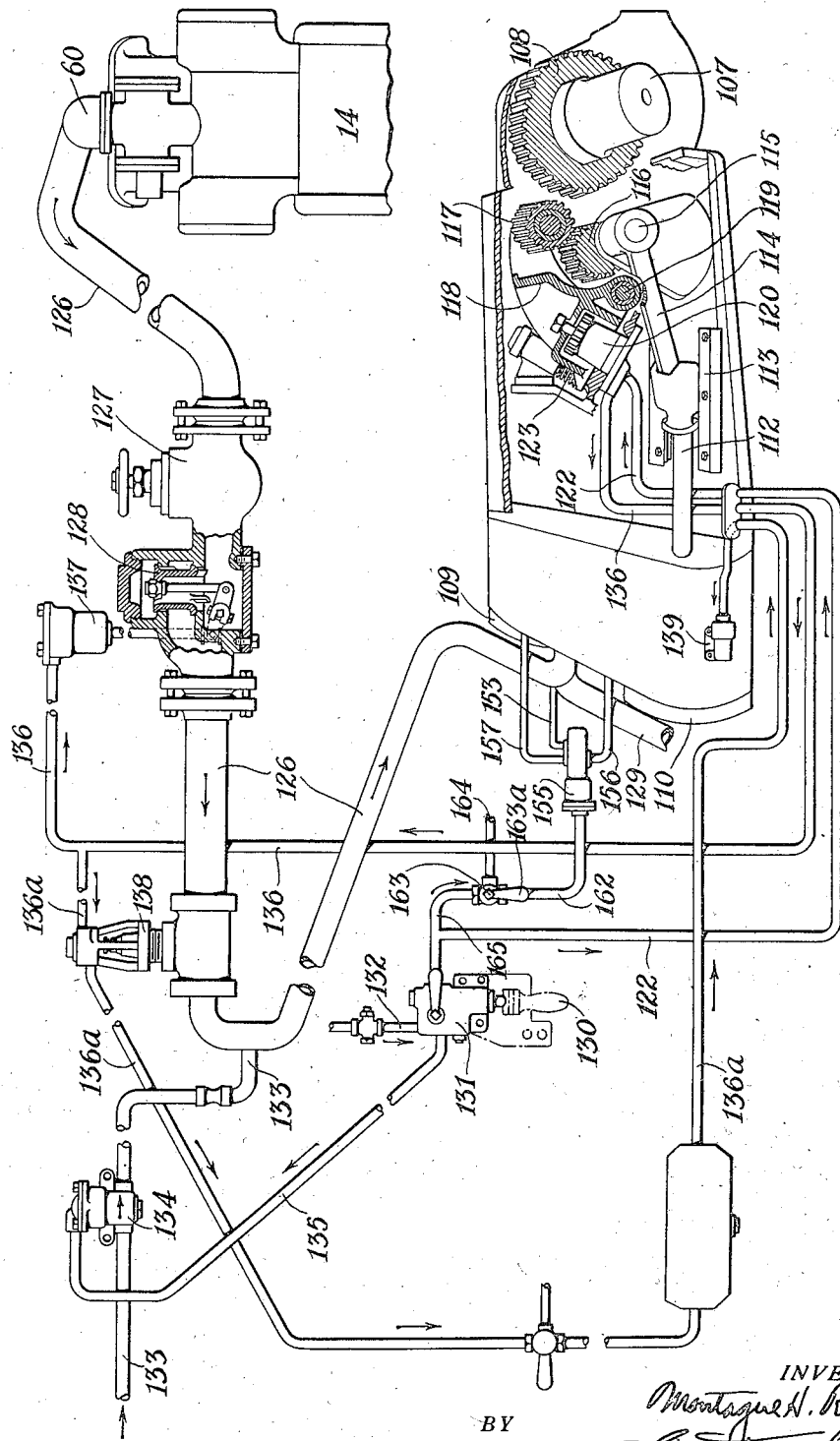
Figure 10 is a somewhat diagrammatic or schematic layout of portions of the booster motor itself together with a preferred form of controlling mechanism and connections therefor.

For the purpose of effecting entrainment and disentrainment of gears 116, 117 and 108, an actuating cylinder 120 may be provided and equipped with a piston 121 subject to fluid pressure admitted through connection 122 (see Figure 10). Spring device 123 serves to maintain the idler gear 117 in disentrained position.

In considering the control of the motor and admission of steam thereto, reference should be made to Figure 10 in which a main engine cylinder is again shown at 14. The main steam supply line or dry pipe to the cylinder 14 is indicated at 60, and it will be seen that a branch or booster supply connection 126 (see also Figures 1 and 2) is coupled with this main steam supply 60. The branch 126 may be equipped with a manually operable shut-off valve 127 and also with a motor actuated booster throttle valve 128 which normally serves as the controlling valve for the booster motor. Beyond the valve 128 the booster supply line 126 is extended to the valve chests of cylinders 109 and 110 of the motor itself, and the exhaust from the cylinders is carried away through a connection such as indicated at 129 (see Figures 10, 11 and 12).

Actual control of the booster motor may be had by means of a latch device 130, operable in any suitable manner as, for example, manually. This latch device operates a valve mechanism indicated at 131 for controlling the flow of fluid pressure, usually air, from supply connection 132 to the entraining motor device 120 through connection 122 above referred to. The connection 132 may, of course, be coupled with the air supply reservoir 94 shown in Figure 5. Upon admission of air through valve 131 and connection 122, the rocker mechanism 118 is raised or advanced in order to bring the teeth of gear 117 into mesh with those of gear 108.

With a view to ensuring proper meshing of the gears, the controlling system for the booster also provides for the admission of a relatively small amount of steam through the separate supply connection 133 which joins the main supply pipe 126 at a point beyond the booster throttle 128. Idling steam may pass through connection 133 when valve device 134 has been opened, and this operation is effected by means of air or other fluid under pressure admitted through pipe 135, which extends from the main control valve 131 to the device 134.

Thus, upon actuation of the booster latch 130, air is very quickly admitted both to the device 134 (in order to open the idling steam line 133) and to the entraining motor or cylinder 120 so that proper idling and entrainment of the gears is ensured.

As soon as entrainment is effected, air is permitted to exhaust from cylinder 120 through connection 136 which extends to motor device 137 for the booster throttle 128 and actuates the booster throttle to admit steam in driving quantities to the cylinders 109 and 110.

A pilot valve device 138 opens communication through the branch air line 136a upon the flow of driving steam through the supply line 126 beyond throttle 128. This branch 136a extends to the booster cylinder cocks 139 and serves to close them during effective driving of the booster engine.

Figure 11:
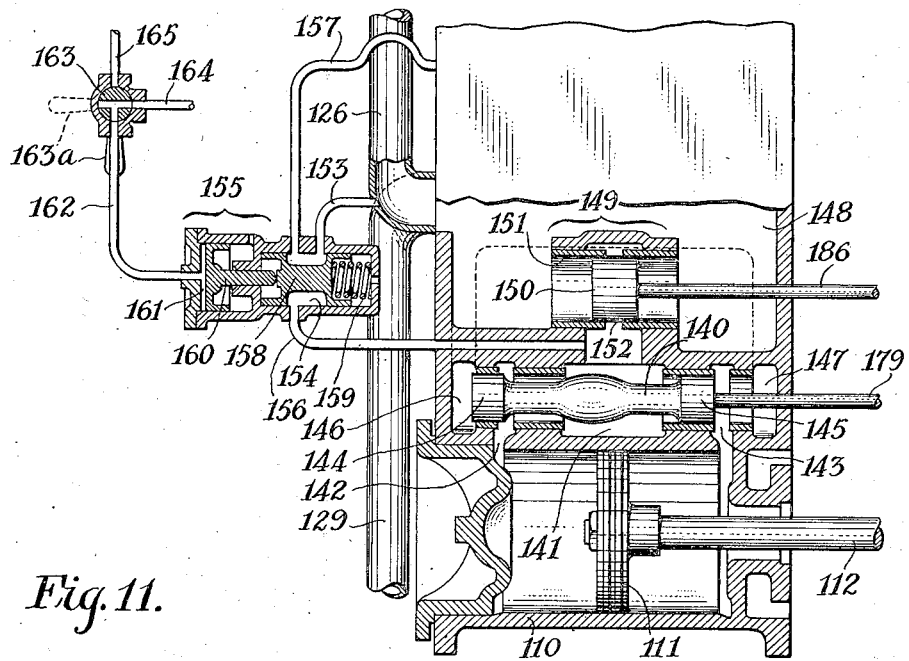
Figure 11 is a sectional view of a booster motor cylinder and certain valve devices associated therewith for controlling the supply of steam.

By reference now to Figure 11 it will be seen that the cylinder 110 is provided with a distributing valve 140 adapted to admit steam from chamber 141 to opposite ends of the cylinder through admission ports 142 and 143. The valve 140 is of the inside admission type and is equipped with valve head parts 144 and 145 which also control the exhaust from both ends of the cylinder to cavities 146 and 147, which communicate with the exhaust pipe 129. Steam entering the valve chest or chamber 148 through the booster supply line 126 may pass into the chamber 141 of valve 140 only through an additional valve device generally indicated at 149. This device includes a piston valve 150 reciprocable in the chamber or casing 151, the latter being provided with a port 152, preferably extended all the way around the valve, which communicates with the receiving chamber 141 of the distributing valve. Upon movement of valve 150 in either direction sufficiently to uncover port 152, steam is admitted from the supply connection 126 to the receiving chamber 141, and is thereafter distributed by the valve 140 to the proper end of the cylinder.

Before considering the operating connections which I have provided for actuating these valves, it should be noted that valve 140 is set or fixed to provide for the admission of steam to the cylinder during a relatively great proportion of each piston stroke, i. e., valve 140 has a relatively late cut-off, for example, at 75%. On the other hand, valve 150 is set to provide a relatively early cut-off, for example, at about 30%. Thus, although a long cut-off is employed for the distributing valve 140, the valve 150 limits the admission of steam through port 152 to a relatively short cut-off, this being the desirable and efficient condition of operation after the locomotive has acquired some forward speed.

However, in accordance with the present invention, I contemplate making available a much longer cut-off for starting purposes and, with this in mind, provision is made for supplying steam to the distributing valve chamber 141 substantially independently of valve 150.

In accordance with the embodiment of Figure 11, a steam pipe 153 is tapped into the booster supply line 126 and extended therefrom into valve chamber 154 of the valve mechanism generally indicated by the numeral 155. Additional connections 156 and 157, one for each cylinder of the motor, are extended from valve chamber 154 and join the main steam supply connections to each chamber 141 at a point between valves 140 and 150. Connections 153 and 156 (referring to Figure 11) therefore constitute a steam by-pass around the cut-off valve 150 similar to the one hereinbefore described with reference to the valves associated with the cylinders of the main engine.

The controlling device 155 further includes a valve 158 slidable in chamber 154 so as to open and close communication between pipe 153 and connections 156 and 157. Valve 158 is preferably normally retained in open position, as shown in Figure 11, by means of a spring 159, and for the purpose of closing this valve, I have provided an actuating piston 160 which may be subject to air or other fluid under pressure in the chamber 161 supplied, for example, through connection 162.

As seen in Figures 10 and 11, the pipe 162 may be connected, by means of valve 163, either to an exhaust 164 or a source of air under pressure through pipe 165. From Figure 10 it will be seen that pipe 165 joins with the air pipe 122 extended to the booster entraining motor and thus communicates with the main control valve 131 to receive air under pressure therefrom. From the foregoing, it will be seen that in accordance with the arrangement of Figures 10 and 11, the shut-off valve for the steam by-pass 153—156 may be manually operated as by means of valve 163 located at any convenient point, for example, in the locomotive cab, an operating handle 163a being provided for this purpose.

Figure 12:
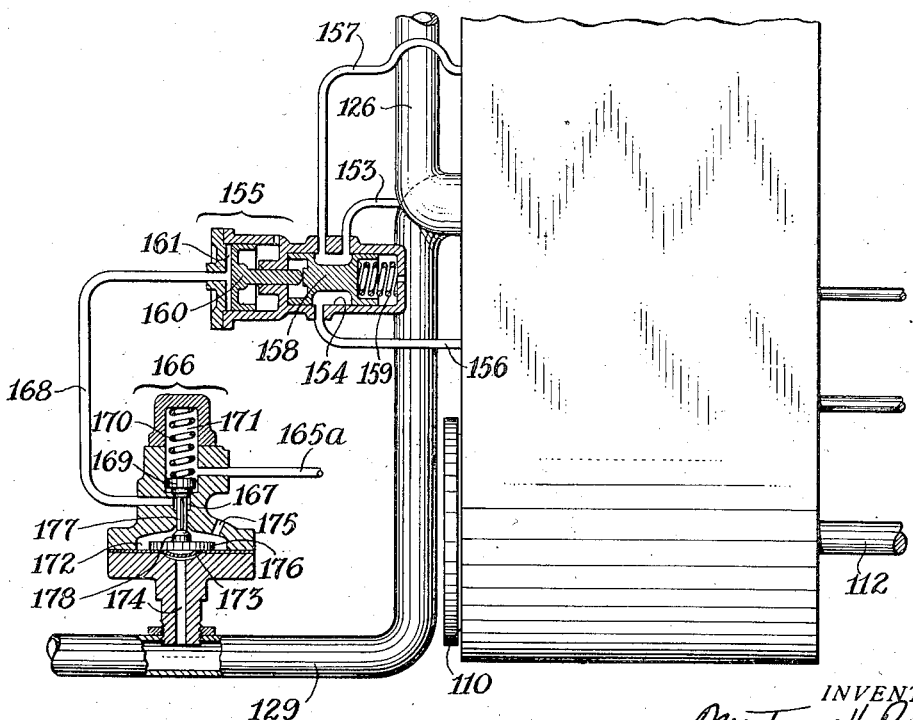
Figure 12 is a view illustrating certain modifications of the arrangements of Figure 11.

In accordance with the modification of Figure 12, the valve device 155 is arranged for operation or control under the influence of the building up of a predetermined cylinder back pressure. To this end, the arrangement of Figure 12 provides for connection of the piston chamber 161 of valve device 155 with a source of air under pressure, represented by the supply pipe 165a, through the intermediation of an additional valve generally indicated at 166. Pipe 165a, of course, may be connected with the main air reservoir on the locomotive, through the main control or pilot valve device 131 shown in Figure 10, in a manner similar to that referred to above in connection with Figure 11. Valve device 166 is provided with a chamber 167 in communication with piston chamber 161 through a pipe 168. A valve 169, urged toward closed position by spring 170, serves to control communication between chamber 167 and chamber 171, the latter, in turn, being in communication with air supply pipe 165a. An additional chamber 172 in valve 166 has a wall formed at one side thereof by means of a flexible diaphragm 173 which is subject, on one face, to the pressure in the exhaust pipe 129 by means of passage 174. Chamber 172 is also provided with an exhaust port 175 which serves to exhaust air from piston chamber 161 through pipe 168, chamber 167 and past the valve stem 177 of valve 169. Upon upward movement of diaphragm 173 under the influence of increasing back pressure in the exhaust pipe 129, the abutment 176 is raised and, through the medium of stem 177, opens valve 169 so as to establish communication between air supply pipe 165a and piston chamber 161 in valve device 155. This upward movement of abutment 176 also causes plug valve 178 to seat against the upper wall of cavity 172 around stem 177 and thus close off communication between pipe 168 and the exhaust port 175.

The arrangement of Figure 12, therefore, provides for automatic closing of communication between the by-pass steam pipe 153 and the connections 156 and 157, which are extended from valve device 155 to the distributing valves of the booster cylinders.

Turning again to the showing of Figures 7, 8, 9, and 11, it will be seen that the stem or actuating element 179 for the main distributing valve is coupled to an eccentric 180 on the crank axle 115 through the following operating elements: links 181, coupled with crank or lever 182, mounted to rock with shaft 183, carrying a second crank 184 which, in turn, is connected by means of link 185 to the eccentric 180. This operating connection for the main or distributing valves of the booster cylinders thus provides for movement of the distributing valve in synchronism with piston movements and, as above noted, I prefer to arrange these parts so as to operate the distributing valves at relatively long cut-off, for example, about 75%. In other words, the distributing valves, if constantly supplied with steam, will admit steam to the cylinder, for example, for approximately 75% of each stroke. The main distributing valves, of course, also serve to control proper exhaust from both ends of the driving cylinders. Since the auxiliary cut-off valve 150 need only serve to alter the period of admission of steam during each stroke of the piston, and for other reasons, I am enabled to employ a materially simplified actuating mechanism therefor. In accordance with the showing of Figures 7, 8, and 9, the stem or operating element 186 of valve 150 (see Figure 11) is connected by means of links 187 with a lever 188 pivoted to some fixed part as at 189. The opposite or free end of lever 188 is provided with an elongated aperture 190 adapted to receive a pin 191 which is mounted for movement with the crosshead 192 and thus with the piston rod 112. Upon reciprocation of the piston 111, therefore, the valve 150 is given a similar reciprocatory movement and, in the preferred arrangement, as brought out above, these operating connections for valve 150 are so constructed as to provide a relatively short cut-off. That is, this valve will supply steam to the distributing valve only, for example, for approximately 30% of each piston stroke.

Figure 9:
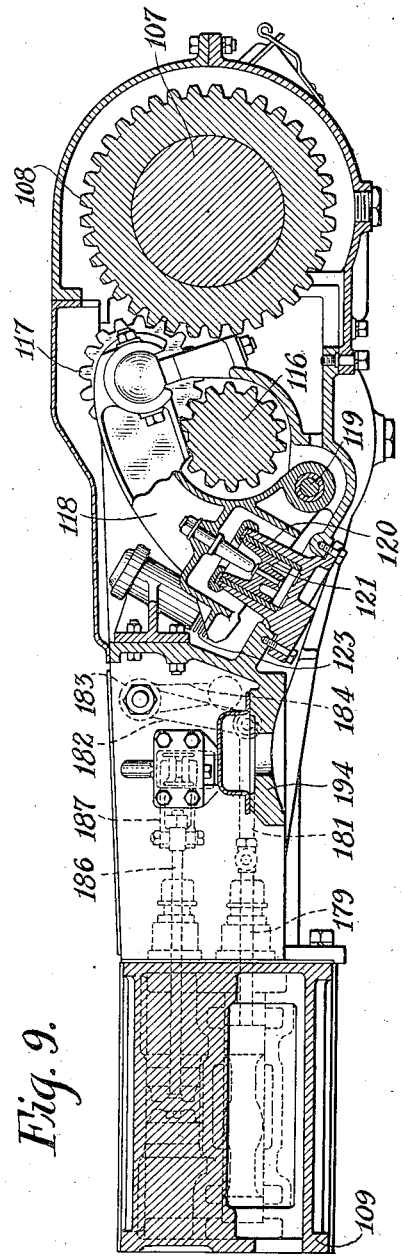
Figure 9 is substantially a longitudinal vertical mid section of the motor with certain parts in elevation.

As seen in Figures 7 and 9, the booster bedplate structure may conveniently be provided with a socket 194 adapted to cooperate with a supporting link mechanism, the socket being located preferably closely adjacent to the center of gravity of the entire booster motor unit. The advantages of this arrangement, especially in connection with other parts of the motor, will be brought out more fully hereinafter.

*Discussion of operation of main and auxiliary engines*

In considering the operation reference is first made to the main engine and its associated controlling valves and the like. Assume now that the lever 53 is positioned at the center of its quadrant 55 (neutral position), and that it is desired to start the main engine. The lever 53, of course, will be thrown forwardly to the position shown in Figures 2 and 5, i. e., to the forward extremity of the quadrant 55 at which time the plunger 90 of pilot valve 81 is actuated to deliver air under pressure from the supply tank 94, through pipe 79 and the check valve device 78, to the forwardly extended connection 77. As seen in Figure 6, the admission of pressure to the cavity 73, through connection 77, moves the actuating piston 74 to the left and to the position shown in Figure 6. In this condition, assuming, of course, that the main locomotive throttle has been or is now opened, steam is permitted to pass from the dry pipe 60 through connection 67, through annular cavity 71 around valve 70, and therefrom through the conduit 68 to the steam cavity 32 (see Figures 3 and 4).

At low speeds, therefore, the main distributing valve 31 which is preferably set to provide a relatively late cut-off (for example, at 70% of the piston stroke) serves to effect distribution and exhaust of steam in substantially the usual manner, it being noted that ample starting power is provided without the use of starting ports and passages, especially where the locomotive, in accordance with the present invention, is also equipped with a booster motor. It will be understood, of course, that the by-pass around the supplementary cut-off valve is of capacity or cross sectional area sufficient to permit operation of the engine, if desired, at least up to a medium running speed. In operation, however, it would be preferable under many conditions to hook back the lever 53 to the second notch at the forward end (notch 100) at a fairly low speed, for example, at 5 miles per hour. This movement of the lever 53, although of insufficient length or throw to materially affect the action of the main distributing valve 31, at the same time, releases the plunger 90 of pilot valve 81 so that the air pressure in pipe 77 is cut off. This return movement of the plunger 90 and the associated valves in pilot device 81 also serves to connect the pipe 77 with the exhaust port 89 in the manner hereinbefore referred to, so that pressure is drained from chamber 73 in the control valve device 72 and the spring 76 moves valves 70 to the right to close the steam by-pass pipes 67 and 68. Under these conditions, of course, steam may reach the cavity 32 of the main distributing valve only through the auxiliary or cut-off valve chamber 57. The ports 59 and 56 of this chamber are controlled by valve 58 which is substantially predeterminedly set to provide a cut-off at a point materially earlier than the normal cut-off of the main distributing valve 31. For example, valve 58 may effect closure of ports 56 and 59 at approximately 30% of the piston stroke, and the main engine, therefore, now operates at an efficient and relatively early cut-off.

Reverse operation, of course, is effected in an entirely similar manner, as by moving the lever 53 in a rearward direction, first to the extremity of its quadrant and thereafter to the second notch 102 for reverse operation at relatively early cut-off.

In considering the operation of the booster motor, assume first that the booster motor is employed in aiding the locomotive to start. Preferably, before actually starting the main engine in the manner hereinbefore described, the booster latch 130, therefore, is actuated to supply air from connection 132 to connections 135 and 122 for the purpose of idling and entraining the booster gearing. Before starting, furthermore, if the arrangement of Figure 11 is employed, the valve operating handle 163a is positioned so as to close communication between pipe 165 and pipe 162 and thus to exhaust air from the actuating piston cylinder 161 through pipes 162 and 164. Spring 159, therefore, maintains valve 158 in open position and thus opens communication between pipe 153 and the branch connections 156 and 157 extended to the several cylinders of the booster engine. Since pipe 153 communicates with the booster supply branch 126 at a point beyond the booster throttles 128 and 134, steam will follow the by-pass (through pipes 153 and 156—157) only after one or both of said throttles has opened in the manner hereinbefore brought out.

With the main locomotive throttle opened steam will be delivered to the main engine cylinders 14 and also to the booster branch 126; and with the main booster throttle open and the valve device 155 conditioned in the manner just referred to, steam will be by-passed around cut-off valve 150. In view of the relatively late cut-off of the distributing valve 140, steam will be admitted to the booster cylinders during a relatively great proportion of each piston stroke. This is desirable, of course, in order to obtain the maximum driving effort in starting, and while the locomotive boiler capacity is ordinarily ample to permit of the use of relatively late cut-off in the main engine as well as in the booster engine valves when a start is being made, at the same time, when a reasonable forward speed is attained, the cut-off on the booster as well as the main engine should be shortened.

With the arrangement of Figure 11, after a start has been made, for example, at 4 miles per hour, the operating member 163a of valve 163 is moved to admit pressure from pipe 165 to pipe 162, the latter being in communication with chamber 161, and air pressure in this chamber causes piston 160 to move to the right, which, in turn, closes valve 158 and thus shuts off the by-pass of steam around the cut-off valve 150. At this time, therefore, the booster cylinders must operate only on the steam admitted by valve 150 to chamber 141, and since valve 150 is set to cut off the supply of steam at approximately 30% of each piston stroke, the proper conditions for operation after a start has been made are provided.

When the modified arrangement of Figure 12 is employed the general booster operation is, of course, similar to that described above but, in view of the use of valve device 166 subject to back pressure in exhaust pipe 129, valve 158 of the controlling device 155 will automatically be closed under the influence of a rise in back pressure to a predetermined value. This arrangement, therefore, automatically ensures against wastage of steam in the booster motor after a start has been made by materially shortening the cut-off.

With regard to the correlation of the main and auxiliary engines to meet actual operating or running conditions, it will be apparent, of course, that, under severe conditions as in starting a heavy train on a grade the main engine and the booster motor will both be operated at relatively late cut-off so as to obtain the maximum drawbar pull. However, it will also be apparent that the booster motor need not always be employed and that where the drawbar pull need only be relatively light, the main engine may efficiently be employed as the sole driving unit of the locomotive.

After a heavy train has been started (with both engines working) the point of cut-off of the booster motor is preferably advanced (either by manipulation of valve 163 with the arrangement of Figure 11, or automatically by means of the back pressure valve 166, as in the arrangement of Figure 12) and, under these conditions, the main engine (at late cut-off) and the booster motor (at early cut-off) may serve to increase the speed of the train at least to a certain extent, after which the main engine control lever 53 may be hooked back to advance the point of steam cut-off to the main cylinders. Efficient operation, therefore, is provided for at relatively high operating speeds.

*Discussion of operational characteristics and advantages*

Figure 13:
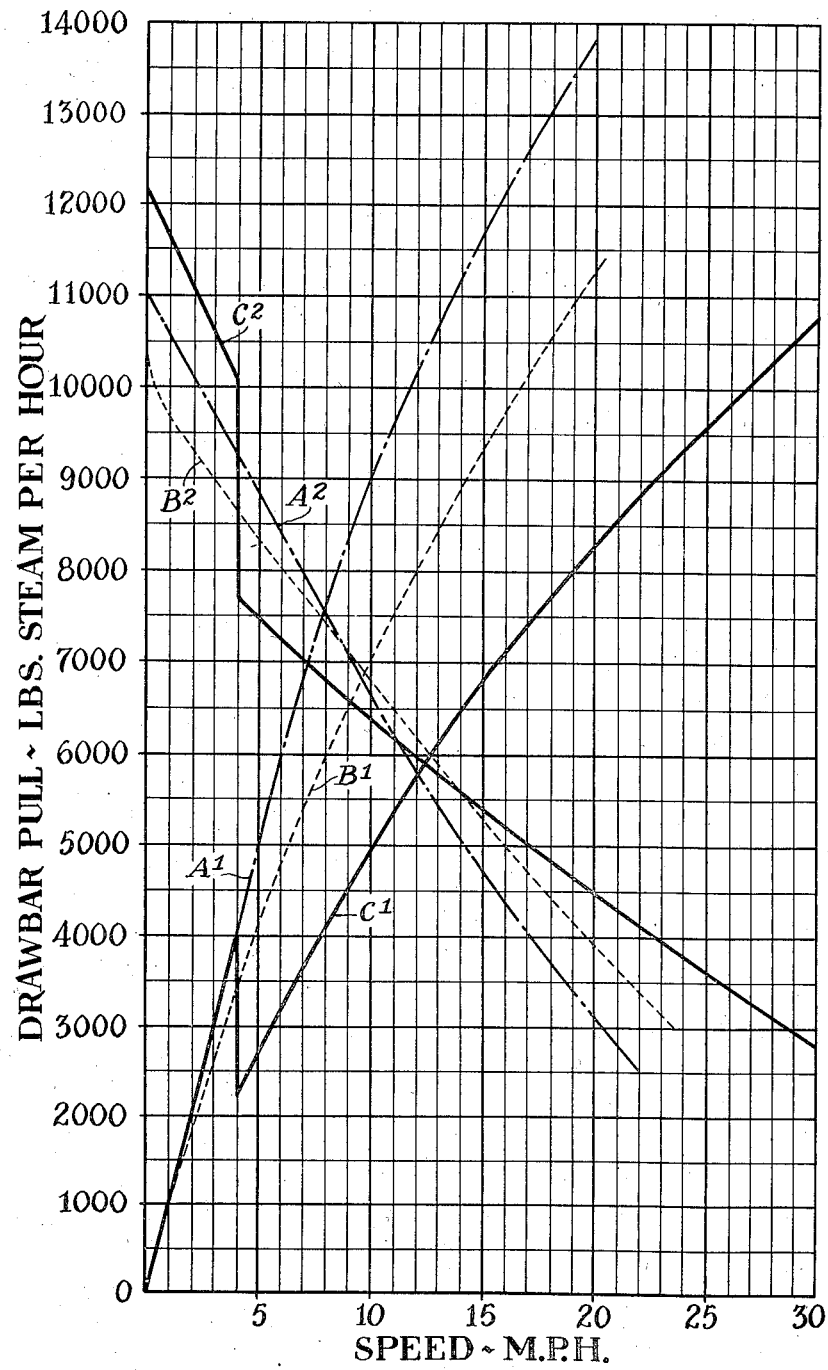
Figure 13 is a graph illustrating certain operating conditions and characteristics of a booster motor constructed and arranged in accordance with the present invention as compared with other auxiliary propulsion units of the fixed cut-off types heretofore employed.

In order that some of the advantages of the steam distribution mechanism herein disclosed (either as applied to a main engine or to a booster motor) may be more clearly understood, reference is now made to the graph of Figure 13 which illustrates by way of example, the results produced in a booster motor constructed and arranged in accordance with the present invention, as compared with other general types of booster motors with single fixed cut-off employed heretofore. In this graph, locomotive speed in miles per hour is plotted on the axis of abscissas and the axis of ordinates is graduated in pounds of drawbar pull and also in pounds of steam consumed per hour. The two dot and dash curves A' and $A^2$ indicate, respectively, speed in miles per hour plotted against consumption of steam in pounds per hour, and speed in miles per hour plotted against drawbar pull in pounds. These two curves, furthermore, represent the results obtained with a booster motor having its valves set at a relatively long or late cut-off, and it will be observed that the steam consumption is very high indeed, especially above five or six miles per hour. On the other hand, the drawbar pull, while it commences at a relatively high value, rather quickly decreases with increase in speed, and is very low in the range from about 15 to 25 miles per hour.

The two curves B' and $B^2$ represent the conditions brought about by the use of a booster motor with its valves set at a single fixed limited cut-off, for example, at 50%. Some improved conditions will here be noted. For example, the steam consumption is somewhat reduced throughout the speed range (except, of course, at start) as compared with curve A'. Additionally, while the drawbar pull at start is not quite as high as with the arrangement represented by the "A" curves, at the same time, the drawbar pull does not drop off with increase in speed quite as rapidly as it does with the arrangement first considered.

These two arrangements are illustrative of types of steam distribution heretofore employed in booster motors in which it has been customary to predeterminedly fix or set the cut-off with a single valve at a mean or average value which, of course, cannot obtain maximum efficiency throughout the range of operating speeds for many well recognized reasons. It will be observed, however, that, especially above about 15 miles per hour, the steam consumption is so high that it is virtually impossible, as a practical matter, to use boosters of the type heretofore provided for any extended period of time at speeds beyond about 15 miles per hour. Among various reasons for this practical impossibility might be mentioned the fact that the capacity of the locomotive boiler is insufficient to maintain the steam supply to the main engine as well as to the booster under such conditions. Additionally, even if the boiler capacity was sufficient to permit extended operation of prior booster arrangements above 15 or 20 miles per hour, such operation would be extremely inefficient in view of the very low drawbar pull as compared with the extremely high steam consumption and high back pressure.

In contrast to the foregoing, attention is now called to the curves $C'$ and $C^2$ which show, in a manner similar to the above, the improved operating conditions brought about by the use of the present invention. Before considering curves $C'$ and $C^2$ it is to be noted that the distribution mechanism of the present invention is especially adapted for use where the boiler steam pressure is relatively high, it being noted that the normal pressures carried on locomotives have been progressively increased over a period of years. (Indeed, certain highly important advantages result when employing the steam distribution mechanism of the present invention on a relatively high pressure locomotive, the reasons being more fully set forth hereinafter.)

Bearing in mind that the distribution valve mechanism of the present invention, as applied to the booster motor (see Figure 11), is such that, at start, very late steam cut-off is provided and further that, after a start has been made, the cut-off is altered by the supplementary valve, so that operation at approximately 30% cut-off is provided for, the marked irregularity of the curves $C'$ and $C^2$ (on the line representing 4 miles per hour) will at once be recognized as resulting from the shift from late to early cut-off. The first specific point to be noticed with regard to curve $C'$ is the fact that, in the initial portion thereof, this curve coincides with a similar portion of curve $A'$, representing a booster motor operating at relatively long cut-off and this, of course, is of material importance and advantage in order to obtain maximum torque and therefore drawbar pull for starting purposes. At the point at which the cut-off is altered (this being represented as occurring at 4 miles per hour in the graph), regardless of whether the change is effected manually as in the arrangement of Figure 11 or automatically as in the arrangement of Figure 12, the curve $C'$, in the first instance, indicates a very decided drop in steam consumption at the speed of change. The drawbar pull (represented by curve $C^2$), of course, also drops materially at the point of cut-off alteration but, since I contemplate employing the steam distribution arrangement in a locomotive carrying a normal steam pressure somewhat above that of prior booster equipped locomotives, the curve $C^2$ begins at a point above either of the other arrangements (curves $A^2$ and $B^2$), and the decrease in drawbar pull therefore does not bring its value materially below that of prior arrangements at this speed of operation. Still further, it will be observed that, above 4 miles per hour, while the drawbar pull continues to decrease somewhat, the rate of decrease per unit of speed increase is materially lower than with the prior arrangements as will readily be seen by comparison of the latter portion of curve $C^2$ with the corresponding portions of curves $A^2$ and $B^2$. Indeed, between approximately 11 and 14 miles per hour, the curve $C^2$ crosses both of the other curves and the present arrangement, therefore, results in tremendously improved operating efficiency at higher speeds.

In addition to all the foregoing, attention is called to the fact that even though the curve $C^2$ indicates a drawbar pull below that of preceding arrangements throughout a small range of forward speeds, the steam consumption, during this range, is reduced very materially below that in the corresponding range with the prior boosters (represented by curves $A'$ and $B'$). The total result of the present arrangement is a net increase in operating efficiency over the entire range of operating speeds. The improvement in efficiency, furthermore, steadily and materially increases as the locomotive speed increases and, as a consequence, I am enabled to use the booster motor at speeds far above those which were practicable or even possible heretofore. By way of illustration, it will be seen from the graph that at approximately 29 miles per hour, the drawbar pull is as great as 3000 pounds, while the steam consumption is only in the neighborhood of 10,500 pounds per hour, which is materially below the steam consumption at 20 miles per hour with a limited cut-off motor of the type heretofore used.

I therefore contemplate a locomotive equipped with a main engine and with a booster motor in which the booster motor may be employed at relatively high speeds of operation and this, in turn, facilitates the construction and arrangement of the distribution mechanism for the main engine in the manner hereinbefore described, according to which provision is made for main engine operation at any one of a plurality of, preferably two, cut-offs, one of which is very late to obtain great power at low speeds and the other of which may be very early indeed (for average running speeds) to ensure high efficiency in normal locomotive operation.

From the consideration of the graph of Figure 13 above, it will be understood that similar operating improvements and efficiencies are produced by the application of the distribution mechanism to the main engine of the locomotive. Furthermore, the efficiencies in the main engine are very marked even though prior practice provided for finely graduated adjustment of cut-off (by the usual reverse lever).

One very marked improvement resulting from the present invention is discussed just below and it is here remarked that the improvement in question is one which is effected regardless of the type of engine to which the present equipment is applied, i. e., whether the equipment be applied to a main engine (as contrasted with a graduated cut-off adjustment of the type heretofore employed) or to a booster motor (as contrasted with booster motors heretofore in more or less general use, wherein the cut-off was substantially predeterminedly fixed at a mean or average value).

To consider the point in question, attention is first called to the fact that the supplemental or cut-off valve of the present invention affects only the point of cut-off and does not necessitate alteration in the points of release, compression or admission. At the outset of the following discussion it should further be borne in mind that while the improvement to be referred to is most noticeable when operating at relatively high steam pressures (for example, 250 pounds and upwards) it is also of material value and advantage in locomotives operating at somewhat lower pressures (for example, in the neighborhood of 200 pounds).

Since the efficiency of a steam engine progressively increases in proportion to the time (of each stroke) during which the steam is employed expansively, it is desirable to shorten the period of admission and this, of course, becomes of increasing importance with higher steam pressures. However (and this is particularly true in a locomotive which must, at least at certain times, operate at relatively high speeds) if steam is admitted during only a relatively small portion of each piston stroke, difficulty is encountered in providing a valve actuating mechanism which will very quickly open and close the admission port. The valve actuating mechanism, of course, must be coupled with the piston in some way in order to correlate its movements with those of the piston, and it is by virtue of this fact that the difficulty primarily arises. Furthermore, for the most efficient operation, the admission port should be almost instantly opened to its fullest extent at an accurately predetermined admission point and similarly, the valve should be very quickly closed at an accurately determined point of cut-off. In the absence of such quick opening and quick closure of the port, especially when operating at a relatively early cut-off and on relatively high steam pressure, wire drawing of the steam results and the economies which should be available by virtue of the use of relatively high pressure steam, to a great extent, are lost.

The foregoing circumstances and difficulties might be further illustrated by reference to Figure 3, it being pointed out that with a main distribution valve (such as the valve 31) set for a relatively long travel and late cut-off, the extent of its movement in each direction beyond the main admission ports is sufficient to permit not only very quick opening of the port but also very quick closure thereof at the desired points of admission and cut-off. If, however, the valve travel and therefore the cut-off is shortened the valve itself must come to rest and commence its reverse motion to close the port almost immediately after the port has been opened and, as a relative matter, the movement of the valve must therefore be quite slow during the time at which opening and closure of the port is taking place, as compared with a long travel and late cut-off, the admission and cut-off of which will occur at points spaced substantially from the extreme positions of valve movement (at which the valve comes to rest and thereafter starts a movement in the opposite direction).

With the foregoing in mind, the present invention, as will be apparent from the preceding description of the apparatus, provides an auxiliary or supplemental cut-off valve the movements of which are preferably of relatively great length or stroke so as to provide for very rapid closure of the steam supply at the desired point of cut-off. The feature above considered is of importance not only in the arrangement as applied to the main engine but also in the arrangement as applied to the booster motor, but with respect to the main engine it is further to be observed that difficulties (especially as to wire drawing of the steam at relatively high pressures and at relatively early cut-offs) are very greatly aggravated in the common finely graduated cut-off controlling mechanisms as now employed in locomotive practice, since it is virtually impossible, at least with the present known types of valve motions, to maintain quick action and at the same time provide graduated variation of cut-off over a range sufficiently broad to afford, on the one hand, long valve-travel and cut-off at start and, on the other hand, short valve-travel and cut-off for normal running speeds. The present invention therefore also contemplates the elimination of the present widely used graduated cut-off arrangements and the substitution of a valve mechanism which includes a main distribution valve which, under all conditions of operation, has a substantially predetermined and relatively long travel and therefore late cut-off, together with a supplemental cut-off valve also of relatively long travel and therefore quick action at the point of cut-off, this latter valve being effective for normal running conditions but being provided with the by-pass arrangements hereinbefore described to permit operation at a longer cut-off at low running speeds. A further advantage of this arrangement is the fact that, when the cut-off is changed from "late" to "early", the points of admission, release and compression are not materially shifted, which is in marked contrast to the graduated cut-off arrangements in most of which the points of release and compression are very materially altered when the cut-off is shortened.

In addition to all the foregoing there are, of course, other advantages involved in the application of my improved steam distribution mechanism to the main engine of the locomotive. Some of these have been mentioned toward the beginning of this specification but at this point it is again noted that the manipulation of the locomotive controls is materially simplified and the operation of the main engine at an efficient cut-off is practically assured, since the engineer need only make one adjustment of the lever 53 when getting under way in either direction.

With regard to the application of the mechanism to the booster motor, especial attention is called to the fact that the arrangement of steam distribution valves and control devices therefor has been worked out so as to be accommodated in a minimum of space and further so as not to increase the overall dimensions of the booster motor, it being particularly noted that both control valves for each cylinder are located laterally inwardly of the cylinders. Furthermore, as seen particularly in Figure 9, the main distribution valve and the supplemental cut-off control valve for each cylinder are positioned generally in two different horizontal planes, i. e., one above the other, and this is important in facilitating extension of the necessary operating connections to the crosshead and the crank shaft of the motor (see also Figure 7).

Although the control valves for each cylinder are located at the inner side of the cylinders, as brought out just above, the arrangement of the valves and their operating or actuating parts is such as to leave clearance (between the valves for the two cylinders) for a flexible support for the booster motor located generally at the center of gravity thereof, as referred to above.

Additionally, a booster motor having dual cut-off is provided, without, however, resorting to the use of a cut-off control mechanism for the main distributing valves which would unduly complicate the structure and which, furthermore, it would be very difficult, if not impossible, to apply to a booster motor in view of clearance and other limitations imposed by application of the motor in the restricted space available.

Still further, the booster motor per se is made considerably more effective in starting the locomotive and, at the same time, considerably more efficient in its operation after a start has been made regardless of whether the main engine is of the graduated cut-off type or of the type herein disclosed, although as fully brought out above, I prefer to employ my improved steam distribution in both engines since important advantages flow from the combination. Many reasons for improvements and efficiencies in the booster itself have already been discussed, but these will stand out even more clearly when it is considered that heretofore the distributing valves for booster cylinders have been set at a mean or average cut-off which was shorter than desirable in making a start and longer than necessary or desirable after a start has been made. The net result, therefore, is a more effective booster motor and, at the same time, a more efficient motor from the standpoint of steam consumption, and finally a booster motor which may be employed throughout a much wider speed range, this being of especial advantage when the main engine is also of the present type.

Another point to be noted is the fact that, particularly with the arrangement of Figure 12, the desirable cut-off conditions for starting and running are assured without adding materially to the controls which must ordinarily be attended by the engineer.

Attention is called to the fact that certain features herein disclosed are described and claimed in my copending application Serial Number 36,052, filed August 14, 1935.

I claim:—

1. The method of operating a booster equipped locomotive having means for altering the cut-off of the booster as well as of the main engine which includes operating the booster as well as the main engine at late cut-off to effect starting and, as the speed of the locomotive increases, first shortening the cut-off of the booster motor and thereafter shortening the cut-off of the main engine.

2. In combination in a locomotive having a boiler, a main steam engine of the cylinder and piston type, an auxiliary steam engine also of the cylinder and piston type, steam supply lines extended from the boiler to said engines, a main distribution valve associated with a cylinder of the main engine, a supplemental cut-off valve in the steam supply in advance of said main distribution valve, the supplemental valve being set to provide steam cut-off at a point in advance of the point of cut-off of the main distribution valve, a steam by-pass around said supplemental valve to provide for delivery of steam to the main distribution valve substantially independently of the supplemental valve, means for shutting off the flow of steam through said by-pass when the supplemental valve is functioning, a main steam distribution valve for the auxiliary engine, a supplemental cut-off valve in the steam supply to the booster engine in advance of its main distribution valve set to cut off the supply of steam to the auxiliary engine at a point in advance of the point of cut-off of the distribution valve of the auxiliary engine, a by-pass around the supplemental valve last mentioned, and means for shutting off the flow of steam through the by-pass last mentioned when the last mentioned supplemental valve is functioning, the by-pass first mentioned being of capacity or size sufficiently great to provide for operation of the main engine after a start has been made up to a medium running speed.

3. In combination in a locomotive having a boiler, a main propulsion engine, an auxiliary propulsion engine, steam supply lines extended from the boiler to said engines, steam distribution mechanism for the main engine providing for operation thereof at any one of a plurality of cut-offs, and steam distribution mechanism for the auxiliary engine providing for operation thereof at any one of a plurality of cut-offs, whereby the auxiliary engine may be employed not only to aid in starting the locomotive but also to aid in driving the locomotive even at a relatively high speed, the steam distribution mechanism for the main engine further including a main distribution valve with actuating mechanism therefor providing relatively long travel thereof, and control means for materially advancing the point of cut-off without materially restricting the movements of the main distribution valve.

4. In a locomotive, a boiler, a main steam engine, an auxiliary steam engine, steam supply lines extended from the boiler to said engines, control mechanism for the main steam engine including two-position cut-off control means providing for operation of the main engine alternatively at either one of two substantially predetermined cut-offs, and control mechanism for the auxiliary steam engine including two-position cut-off control means providing for operation of the auxiliary engine alternatively at either one of two substantially predetermined cut-offs.

5. In a locomotive, a boiler, a main steam engine, an auxiliary steam engine, steam supply lines extended from the boiler to said engines, control mechanism for the main steam engine including two-position cut-off control means providing for operation of the main engine alternatively at either one of two substantially predetermined cut-offs, and control mechanism for the auxiliary steam engine constructed and arranged to provide for use thereof during starting and at relatively low speeds and to permit rendering the auxiliary engine substantially inoperative at high speeds of locomotive operation.

MONTAGUE H. ROBERTS.